United States Patent [19]
Hisano et al.

[11] Patent Number: 5,792,022
[45] Date of Patent: Aug. 11, 1998

[54] CONTROL SYSTEM FOR AUTOMATIC TRANSMISSIONS

[75] Inventors: Takayuki Hisano; Kazumasa Tsukamoto; Masahiro Hayabuchi; Hiroshi Tsutsui, all of Anjo, Japan

[73] Assignee: Aisin Aw Co., Ltd., Anjo, Japan

[21] Appl. No.: 771,134

[22] Filed: Dec. 20, 1996

[51] Int. Cl.$^6$ ............................. F16H 61/04; F16H 59/42
[52] U.S. Cl. ..................... 477/116; 477/117; 477/156
[58] Field of Search ..................... 477/116, 117, 477/143, 156, 157, 158; 475/116

[56] References Cited

U.S. PATENT DOCUMENTS

| | | | |
|---|---|---|---|
| 4,944,200 | 7/1990 | Benford et al. | 477/156 |
| 5,088,357 | 2/1992 | Kamada et al. | 477/117 |
| 5,351,577 | 10/1994 | Ando et al. | 477/116 |

FOREIGN PATENT DOCUMENTS

| | | | |
|---|---|---|---|
| 3-260458 | 11/1991 | Japan | 477/116 |
| 4-337160 | 11/1992 | Japan | 477/116 |
| A-6-323377 | 11/1994 | Japan | |

Primary Examiner—Khoi Q. Ta
Attorney, Agent, or Firm—Oliff & Berridge, PLC

[57] ABSTRACT

A control system for use in an automatic transmission having a transmission mechanism for establishing a plurality of forward stages, a neutral state and a reverse stage. The transmission mechanism includes a predetermined rotary element to be retained for establishing the reverse stage; a reverse brake for retaining the rotary element; and a frictional engagement element capable of stopping the rotation of the rotary element. The reverse brake is a meshing type brake which meshes with and retains the rotary element. The control system has an engagement mechanism for applying the frictional engagement element. When the reverse stage is selected, the frictional engagement element is applied at least until the meshing engagement of the reverse brake is established, to stop the predetermined rotary element.

15 Claims, 9 Drawing Sheets

|     | C-1 | C-2 | B-1 | B-2 | B-3 | B-R |
|-----|-----|-----|-----|-----|-----|-----|
| P   |     |     |     |     | ○   |     |
| REV | ○   |     |     |     |     | ○   |
| N   |     |     |     |     | ○   |     |
| 1ST | ○   |     |     |     | ○   |     |
| 2ND |     | ○   |     |     | ○   |     |
| 3RD | ○   | ○   |     |     |     |     |
| 4TH |     | ○   | ○   |     |     |     |
| 5TH |     | ○   |     | ○   |     |     | ific addition

CONTROL SYSTEM FOR AUTOMATIC TRANSMISSIONS

BACKGROUND OF THE INVENTION

1. Field of the Invention

The invention relates to a control system for an automatic transmission and, more particularly, to a control system for controlling a reverse stage establishing brake and an input clutch in a transmission mechanism in an automatic transmission.

2. Description of Related Art

In the automatic transmission of the prior art, a brake acting as an engagement element for establishing a reverse stage is applied by the pushing of a plurality of friction discs by a hydraulic servo. The brake is composed of a friction member and a separator plate, one of which is non-rotatably supported at the side of a rotary element in the transmission mechanism and the other of which is non-rotatably supported at the side of a stationary member, such as a transmission case. The reverse stage is established by retaining the rotary element, which acts as a reaction element at the time the reverse state is established, on the stationary member by the reverse brake. The reverse brake can be applied by a pushing force from the hydraulic servo while the rotary element to be retained is rotating, that is, while there is a relative rotation between the friction member and the separator plate of the friction discs.

Incidentally, when the push force for pushing the friction discs of the aforementioned brake is released, a gap is held between the friction member and the separator plate. However, this gap is minute so that in the brake applying response, the oil to be circulated for lubricating the individual portions of the transmission mechanism exists even in the aforementioned gap. As a result, it is impossible to cause dragging by the oil at brake release. This dragging causes a resistance which lowers the transmission efficiency of the automatic transmission.

In addition, the reverse stage of the automatic transmission is set at a high gear ratio so that the torque amplification in the transmission mechanism is large at the reverse stage establishing time for applying a high torque to the friction discs for supporting the reaction torque. This arrangement makes it necessary to provide a number of friction members for coping with the torque to be absorbed. If the number of friction members increases, the resistance due to the aforementioned dragging grows to an undesirably high level for keeping the transmission efficiency of the automatic transmission. One measure for eliminating the dragging is a structure using a meshing brake in which the teeth are meshed with each other as in the dog clutch. In this meshing brake, however, an undesired chattering may occur when the teeth are to be mutually meshed while a rotary element to be retained is not stopped.

When establishing the reverse stage in the automatic transmission, an input clutch for transmitting power, which is not applied in a neutral (N) state, is applied by selecting a reverse (R) range and a brake for establishing the reverse range is then applied. This method implies that the operation to bring the brake into meshing engagement may be performed prior to the application of the input clutch so that the aforementioned gear chattering may be avoided while using the mesh type brake. In the ordinary operation, however, the aforementioned dragging occurs, not only in the friction discs of the brake, but also in the friction discs of the input clutch of the friction clutch type brake. In that case, the rotary element, to be retained for establishing the reverse stage, is being slightly rotated by the dragging of the clutch even with the input clutch being released. Therefore, merely by controlling the application order of the clutch and the brake, the gear chattering cannot be prevented.

SUMMARY OF THE INVENTION

It is, therefore, a first object of the invention to provide a control system for an automatic transmission, which can establish a reverse stage without stopping the relative rotation of a meshing type brake when meshing occurs. This arrangement causes no uncomfortable chattering, even though the meshing type brake, which causes no dragging is used to improve the transmission efficiency.

A second object of the invention is to prevent the aforementioned gear chattering in the aforementioned system by using a frictional engagement element for establishing a forward stage to stop the relative rotation at a brake meshing time without the need of any special additional engagement element.

A third object of the invention is to improve the transmission efficiency by reducing the drag of the aforementioned frictional engagement element.

A fourth object of the invention is to effect hydraulic control, as in the frictional engagement element of the prior art, by structuring the hydraulic servo of the aforementioned meshing type brake like the hydraulic servo of the ordinary frictional engagement element.

A fifth object of the invention is to prevent an influence upon a forward gear stage when using a frictional engagement element in establishing the forward gear stage to prevent gear chattering.

A sixth object of the invention is to simplify the structure of the decision means necessary for control to prevent gear chattering.

A seventh object of the invention is to determine the meshing state of the aforementioned meshing type brake, in a reliable manner, with the oil pressure as the control.

An eighth object of the invention is to prevent the generation of gear chattering which might otherwise be caused by the application delay of the frictional engagement means in stopping the relative rotation of the aforementioned brake.

A ninth object of the invention is to optimize the application timing of a friction clutch for power transmission, thereby achieving a smooth meshing engagement of a reverse brake.

A tenth object of the invention is to achieve a reliable meshing engagement of the reverse brake by optimizing the application timing of the friction clutch.

An eleventh object of the invention is to simplify the structure of the decision means by performing the determination of the completion of the meshing of the meshing type brake in terms of a time elapsed.

A twelfth object of the invention is to provide more reliable decision making by determining the meshing completion of the meshing type brake in terms of the detection of an oil pressure.

A thirteenth object of the invention is to improve the response time in establishing the rear stage by causing the friction clutch to be in a stand-by mode immediately before the application, thereby to effect the application of the clutch promptly and simultaneously with the meshing completion of the meshing type brake.

A fourteenth object of the invention is to make the prompt establishment of the reverse stage possible even when the change from the forward range to the reverse range of the automatic transmission is abrupt.

In order to achieve the aforementioned first object, according to the invention, an automatic transmission comprises a transmission mechanism for establishing a plurality of forward stages, a neutral state and a reverse stage. The transmission mechanism includes a predetermined rotary element to be retained for establishing the reverse stage; a reverse brake for retaining the rotary element; and a frictional engagement element capable of stopping the rotation of the rotary element; and wherein the reverse brake is a meshing type brake for retaining the rotary element by meshing with the rotary element, a control system comprising engagement means for applying the frictional engagement element, when the reverse stage is selected, at least until the meshing engagement of the reverse brake is established, to stop the predetermined rotary element.

In order to achieve the aforementioned second object, the frictional engagement element is applied when the forward stages are established, and retains a second rotary element other than the predetermined rotary element.

In order to achieve the aforementioned third object, the frictional engagement element is made of a band brake.

In order to achieve the aforementioned fourth object, the reverse brake includes a hydraulic servo and a meshing member which are moved against the push force of a return spring when a piston of the hydraulic servo moves to come into meshing engagement with the predetermined rotary element.

In order to achieve the aforementioned fifth object, the control system further comprises decision means for deciding the meshing stage of the meshing member of the reverse brake, and the engagement means brings the frictional engagement element into engagement until the meshing start is detected by the decision means.

In order to achieve the aforementioned sixth object, the decision means decides the meshing start in terms of the lapse of a predetermined time from the selection of the reverse stage. The predetermined time is the time period from the start of the supply of an oil pressure to the hydraulic servo of the reverse brake to the start of the meshing engagement of the meshing member.

In order to achieve the aforementioned seventh object, the decision means includes an oil pressure sensor disposed in an oil passage which is connected to the hydraulic servo of the reverse brake, to determine the meshing start when the signal from the hydraulic sensor takes an oil pressure value corresponding to the meshing start position of the meshing member.

In order to achieve the aforementioned eighth object, the frictional engagement element is also applied when in the neutral state.

In order to achieve the aforementioned ninth object, the reverse stage is established by applying the predetermined rotary element with the reverse brake and by inputting the power to a third rotary element by applying a friction clutch. The friction clutch is then left in a released state until the meshing start of the reverse brake is detected.

In order to achieve the aforementioned tenth object, the control system further comprises second decision means for determining the completion of movement of the meshing member when the stroke of the piston of the hydraulic servo of the reverse brake is completed. The reverse stage is established by inputting power to the third rotary element, through the retention of the predetermined rotary element of the reverse brake and by the application of the friction clutch which is applied after completion of the piston stroke of the hydraulic servo of the reverse brake.

In order to achieve the aforementioned eleventh object, the second decision means determines that meshing is completed when a second predetermined time elapses from the selection of the reverse stage. The predetermined time is set to a time period from the start of the supply of the oil pressure to the hydraulic servo of the reverse brake to the completion of the movement of the meshing member.

In order to achieve the aforementioned twelfth object, the second decision means includes an oil pressure sensor disposed in an oil passage which is connected to the hydraulic servo of the reverse brake. The second decision means determines the completion of movement of the meshing member when a signal is sent from the oil pressure sensor.

In order to achieve the aforementioned thirteenth object, the friction clutch is applied by a hydraulic servo which is fed at first with the oil pressure immediately before the start of the application of the friction clutch, and then with oil pressure gradually raised simultaneously with the completion of movement of the meshing member.

In order to achieve the aforementioned fourteenth object, the lowermost forward gear stage is established by applying the friction clutch and the frictional engagement element.

In the invention thus structured, when the meshing type reverse brake is to be meshed, the frictional engagement element is applied, and the predetermined rotary element, which meshes with the reverse brake, is stopped so that no uncomfortable gear chattering occurs when the reverse stage is selected.

According to the structure for achieving the second object, the frictional engagement element to be applied at the forward stage establishing time is used for stopping the predetermined rotary element, which establishes the reverse stage, so that the present control can be effected by the compact structure without any special additional frictional engagement element.

According to the structure for achieving the third object, the frictional engagement element, for stopping the predetermined rotary element and establishing the reverse stage, is exemplified by the band brake, which has a lower dragging loss than the multiple disc brake, resulting in an improvement in the transmission efficiency coming from the meshing type reverse brake.

According to the structure for achieving the fourth object, following the hydraulic control mode in which the brake, used in the automatic transmission of the prior art is employed as the frictional engagement element, control of the meshing type brake is used along with the control of another frictional engagement element, to improve the overall control of the automatic transmission.

According to the structure for achieving the fifth object, the frictional engagement element can be applied when necessary, so that its resulting influence is minimized when applied at the forward and reverse stages.

According to the structure for achieving the sixth object, the determination for application control can be made in terms of the time elapsed so that the structure of the decision means can be simplified to require no special detection means.

According to the structure for achieving the seventh object, the oil pressure for the meshing start position, as detected by the oil pressure sensor, can be determined in relation to the spring constant of the return spring of the meshing type brake so that the meshing start position can be determined reliably.

According to the structure for achieving the eighth object, even if the reverse range is selected from the neutral range, the frictional engagement element has already been applied at the reverse range selecting time so that the gear chattering due to the application delay of the frictional engagement element can be prevented.

According to the structure for achieving the ninth object, at the time of the application of the reverse brake, the transmission of torque to the predetermined rotary element applying the friction clutch, can be prevented to establish the smooth meshing engagement of the reverse brake.

According to the structure for achieving the tenth object, because the friction clutch is applied after the determination of the completion of movement of the meshing member, the loss of smooth movement and the elongation of the movement of the meshing member, that are caused by applying the friction clutch during the movement of the meshing member and transmission of the torque to the meshing member are prevented. As a result, the reverse brake can be meshed promptly and reliably.

According to the structure for achieving the eleventh object, meshing completion determines the second decision means in terms of the time elapsed, so that the structure of the second decision means can be simplified without any special detection means.

According to the structure for achieving the twelfth object, the oil pressure at the meshing completion position can be determined in connection with the spring constant of the return spring so that the meshing completion can be decided reliably.

According to the structure for achieving the thirteenth object, the friction clutch is applied simultaneously with the completion of movement of the meshing member and causing it to stand-by immediately before its application start, so that the reverse stage can be achieved as fast as possible.

According to the structure for achieving the fourteenth object, when the reverse range is selected from the forward range, the frictional engagement element moves from the application at the lowermost forward gear state, through the application in the neutral range, to the application of the present control, for smoother control.

BRIEF DESCRIPTION OF THE DRAWINGS

The invention will be described with reference to the drawings, in which.

DESCRIPTION OF THE PREFERRED EMBODIMENTS

Figures 1, 2:
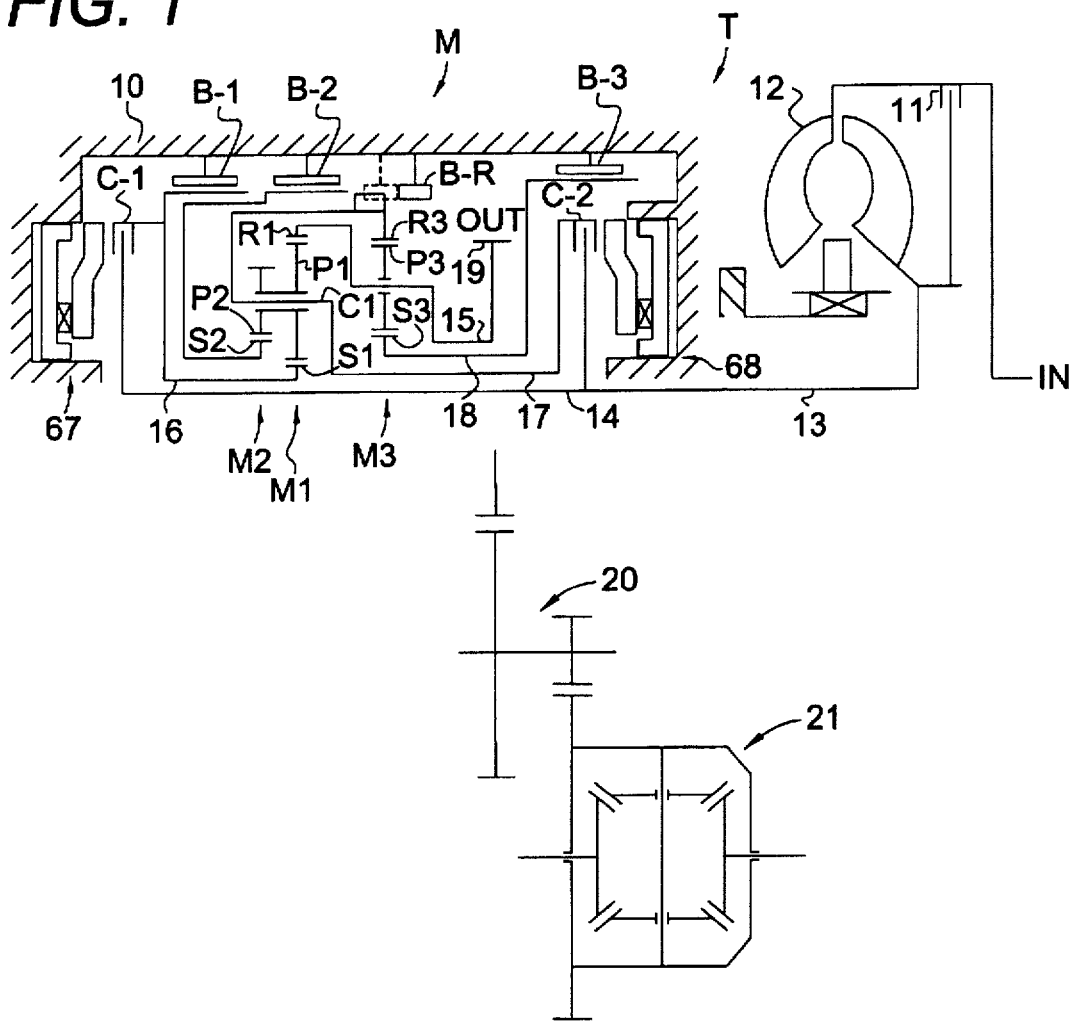
FIG. 1 is a schematic diagram showing the mechanism of a transfer unit including an automatic transmission of the first embodiment, to which is applied the control system of the invention.
FIG. 2 is an operation diagram of the aforementioned automatic transmission.

The embodiments of the invention will be described with reference to the accompanying drawings. FIG. 1 shows an automatic transmission, to which a control system of the invention is applied, in combination with a differential unit which provides a transfer unit of transverse structure. The description begin from the schematic structure of the mechanism. This system is structured to comprise an automatic transmission T, including a torque converter 12 having a lockup clutch 11 connected to the engine of a vehicle, and a transmission mechanism M composed of three stages of planetary gear sets M1, M2, M3 for changing speeds of the output of the torque converter 12 to five forward and one reverse speed ranges; and a differential unit 21 connected to the automatic transmission T through a counter gear 20 acting as a reduction gear mechanism for transmitting the output of the automatic transmission T to the right and left wheels of the vehicle.

In the transmission mechanism M of the automatic transmission T, the larger- and smaller-diameter pinion gears P1, P2 of the two gear sets M1, M2, respectively, are directly connected to each other; the respective ring gears R1, R3 and carriers C3, C1 of the two gear sets M1, M3, respectively, are connected to each other; and the sun gear S1 and the carrier C1 of the gear set M1 are connected through clutches C-1, C-2 to an input shaft 14, which leads to a turbine shaft 13 of the torque converter 12, so that they may act as input elements. In addition, the ring gear R1 and the carrier C3, which are then connected to each other, are connected through an output shaft 15 to an output gear 19 which acts as an output element. Moreover, a sun gear Si of the gear set M1 can be retained on a transmission case 10 by a brake B-1; a sun gear S2 of the gear set M2 can be retained on the transmission case 10 by a brake B-2; a sun gear S3 of the gear set M3 can also be retained on the transmission case 10 by a brake B-3; and the ring gear R3, as connected to the carrier C1, can be retained on the transmission case 10 by a brake B-R.

In this embodiment, more specifically, the sun gear S1 is connected to the clutch C-1 through a sun gear shaft 16 fitted on the outer circumference of the input shaft 14; the carrier C1 is connected to the clutch C-2 through a carrier shaft 17 fitted on the outer circumference of the input shaft 14; and the sun gear S3 is connected to the brake B-3 through a sun gear shaft 18 fitted on the outer circumference of the carrier shaft 17. In this mode, hydraulic servos 67, 68 of the two clutches C-1, C-2 are formed into stationary cylinders arranged in the transmission case 10. Moreover, the individual brakes, other than the brake B-R, are exemplified by band brake structures. However, the brake B-R is exemplified by a meshing type brake structure and the brake hydraulic servos are not shown. The output gear 19, which acts as an output element, is connected through the counter gear 20 to the differential unit 21.

Under the control of an electronic control unit and a hydraulic control unit, as described with reference to FIGS. 4 and 5, the automatic transmission T thus structured establishes the individual gear stages by feeding the oil pressure to the hydraulic servos corresponding to the individual clutches and brakes for application (as indicated by symbols O) and release (as indicated by blanks), as tabulated in FIG. 2. Specifically, the first speed range ($1^{ST}$) is established by applying the clutch C-1 and the brake B-3. At this time, the rotation of the input shaft 14 enters the sun gear S1 through the clutch C-1 so that the rotation of the carrier C3, which is has been decelerated by the engagement of the sun gear S3 from the application of brake B-3, is output to the output gear 19. In addition, the second speed range ($2^{ND}$) is established by applying the clutch C-2 and the brake B-3. At this time, the input, having entered the carrier shaft 17 through the clutch C-2, enters into the ring gear R3 through the carrier C1. This causes the differential rotation of the carrier C3, which uses the sun gear S3, as retained by the application of the brake B-3, as a reaction element. The result is then output to the output gear 19. The third speed ($3^{RD}$) range is established by the direct connection of the first planetary gear set M1, through the application of the two clutches C-1, C-2. When this occurs, the rotation of the input shaft 14 is output as the rotation of the carrier C3 to the output gear 19.

The fourth speed range ($4^{TH}$) or higher speeds of this automatic transmission are designated as overdrive, and the fourth speed range ($4^{TH}$) is established through the application of the clutch C-2 and the brake B-1, which retains the sun gear S1. When this occurs, the rotation of the input shaft 14 is transferred from the carrier C3 to the output gear 19 as the rotation of the ring gear R1, which is increased by the rotation of the carrier C1 via the rotation of the pinion gear P1. In addition, the fifth speed range (5th) is established through the application of the clutch C-2 and the brake B-2. When this occurs, the rotation of the input shaft 14 is transferred from the carrier C3 to the output gear 19, as the rotation of the ring gear R1, which is further increased more than during the establishment of the fourth speed range ($4^{TH}$) by the rotation of the carrier C1, via the smaller-diameter pinion gear P2, which opposes the larger-diameter sun gear S2.

In addition, the reverse speed range (REV) is established by applying the clutch C-1 and the brake B-R. When this occurs, the rotation of the carrier C1 is stopped by the retention of the ring gear R3 to the case 10, through the application of the brake B-R, against the input to the sun gear S1 through the clutch C-1, and the rotation of the ring gear R1, which is decelerated by the reverse rotation caused by the rotation of the pinion gear P1, is output from the output gear 19 through the carrier C3.

The automatic transmission T thus structured, is embodied, as described above, by exemplifying the predetermined rotary element to be retained for establishing the reverse stage, by the ring gear R3; the reverse brake for the retention by the brake B-R; the frictional engagement element capable of stopping the ring gear R3 in the neutral state using the brake B-3; the second rotary element as the sun gear S3; the third rotary element as the sun gear S1; and the friction clutch for inputting power to the clutch C-1. The brake B-3 is intrinsically provided for establishing the first speed and the second speed, as described above and is caused to stop the rotation of the sun gear S3. The sun gear S3 meshes with the planetary gear set M3 shared with the ring gear R3 and retained by the brake B-R, to stop the rotation of the planetary gear set M3, thereby stopping the rotation of the ring gear R3 indirectly. In addition, the reverse brake is a meshing type brake which meshes with the ring gear R3 thereby retaining the ring gear R3 on the case 10, as shown in detail in FIG. 3. The means for controlling the brake B-R and the brake B-3 in association with the friction clutch C-1, is exemplified by engagement means which applies the brake B-3, from the time the reverse stage is selected, at least until the meshing engagement of the reverse brake B-R is established, thereby stopping the ring gear R3. This engagement means is embodied by a circuit in the hydraulic control unit, as shown in FIG. 5, and a program in the electronic control unit (ECU), as shown in FIG. 4, for controlling the circuit with electric signals.

Figure 3:
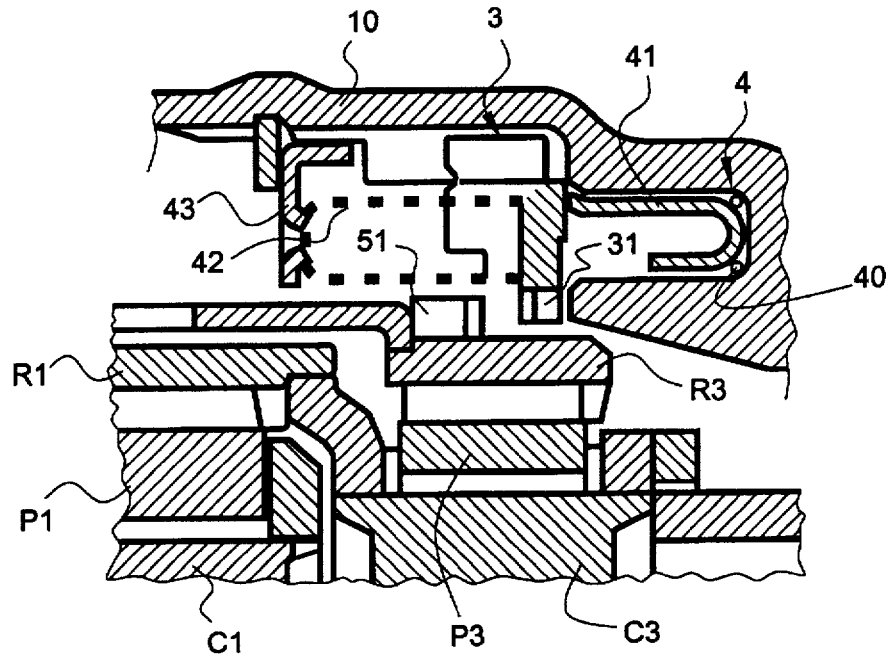
FIG. 3 is a section showing a portion of a meshing type brake of the aforementioned automatic transmission.

As shown in detail in FIG. 3, the meshing type brake is composed of a meshing member 3 and a hydraulic servo 4. The meshing member 3 is an annular member which is slidably splined at its outer circumference on the case 10 for moving axially, and which has such meshing teeth 31 formed in its inner circumference as to mesh with meshing teeth 51 formed in the outer circumference of the ring gear R3. The hydraulic servo 4 is composed of a hydraulic cylinder 40 formed in an annular shape in the step portion of the case 10; an annular piston 41 having a J-shaped section made of a press material so as to fit in the hydraulic cylinder 40 and axially slide; and a return spring 42 which is fixed at its one end in the case 10 through a spring seat 43 by a snap ring and supported at its other end in abutment against the meshing member 3 to load the meshing member 3 with a return force. Moreover, the meshing member 3 is attached to the leading end of the piston 41. In addition, the outer circumferential meshing teeth 51 of the ring gear R3 is formed into the teeth which protrude radially outward from the outer circumference of the ring gear R3.

Next, the brake B-3 acting as the frictional engagement element is exemplified by the ordinary band brake, as described with reference to FIG. 1, although not shown in detail. Thus, the brake B-3 is composed of a band supported at the side of the case 10 and a drum connected to the sun gear S3 through the sun gear shaft 18, and is equipped with a hydraulic servo 69 (as shown in FIG. 5) for applying the brake B-3 by fastening the band on the drum.

Figure 5:
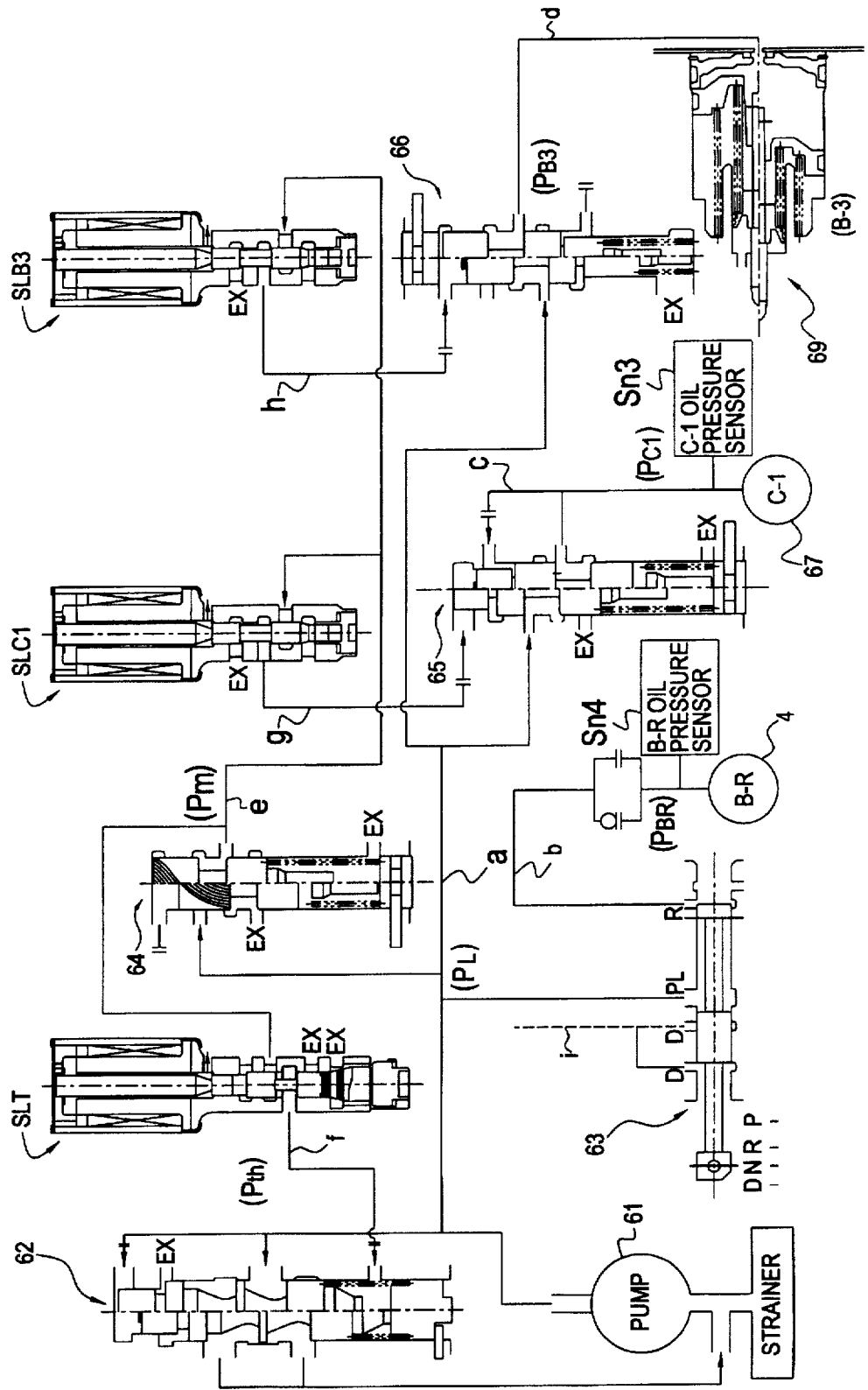
FIG. 5 is a circuit diagram showing a portion of the hydraulic circuit of the aforementioned automatic transmission.

FIG. 5 shows only the circuit portion of the hydraulic control unit of the automatic transmission T concerned with the control of the invention. This circuit uses a pump 61, which is driven by the turbine shaft 13 of the torque converter 12 (shown in FIG. 1) for: 1) discharging the oil, 2) as the oil pressure source, and 3) for providing a control circuit for feeding the oil pressure to the individual hydraulic servos 67, 4, 69 of the friction clutch C-1, the meshing brake B-R and the band brake B-3. In this circuit, the arrangement includes a manually operated manual valve 63, individual hydraulically actuated regulator valves 62, 64, 65, 66, and individual solenoid-actuated linear solenoid valves SLT, SLC1, SLB3.

To a line pressure oil passage a, leading to the discharge side of the pump 61, the primary regulator valve 62 is connected and equipped with a spring-loaded spool. This valve 62 is fed with a later-described throttle pressure Pth at the spring-loaded side of its spool and fed back with a line pressure ($P_L$) at the opposite side. The line pressure ($P_L$) is then regulated to a necessary oil passage according to the vehicle load (as usually calculated on the basis of the vehicle speed and the throttle opening) while suitably draining the line pressure ($P_L$) to the suction side of the pump 61.

To the line pressure oil passage a is a manual valve 63 that is connected thereto and which is equipped with a spool to be switched according to the shift position. The valve 63 is switched on its spool to connect the line pressure oil passage a to a D-range oil passage i or an R-range oil passage b. To the line pressure oil passage a, the solenoid modulator valve 64 is connected which is fed with the feedback pressure at the opposite end of the spring-loaded spool to reduce the line pressure ($P_L$) to a modulator pressure ($P_m$) for output to a modulator pressure oil passage e.

The modulator pressure oil passage e, is connected to the individual linear solenoid valves. The linear solenoid valve SLT is a regulator valve for displacing the spool on the basis of a duty signal fed to the linear solenoid, thereby to output the solenoid pressure Pth. The output of the linear solenoid valve SLT is fed via a throttle pressure oil passage f to the spring-loaded side of the aforementioned primary regulator valve 62. The linear solenoid valve SLC1 is also a regulator valve which applies the solenoid pressure via a solenoid pressure oil passage g to the C-1 control valve 65. The linear solenoid valve SLB3 is also a regulator valve which applies the solenoid pressure via a solenoid pressure oil passage h to the B-3 control valve 66.

The C-1 control valve 65, which is connected to the line pressure oil passage a, is a spool type regulator valve and is fed with the solenoid pressure of the aforementioned solenoid pressure oil passage g to its different diameter portion with the feedback pressure against the spring load and regulates an oil pressure ($P_{C1}$) of a supply oil passage c leading to the hydraulic servo 67. The B-3 control valve 66, as connected to the line pressure oil passage a, is also a spool type regulator valve and is fed with the solenoid pressure of the aforementioned solenoid pressure oil passage h against the spring load, and to its different diameter portion with the feedback pressure in the spring load direction regulates an oil pressure ($P_{B3}$) of a supply oil passage d leading to the hydraulic servo 69. The oil pressure is fed through an orifice, having a check valve, to the hydraulic servo 4 which is connected to the R-range oil passage b.

Figure 4:
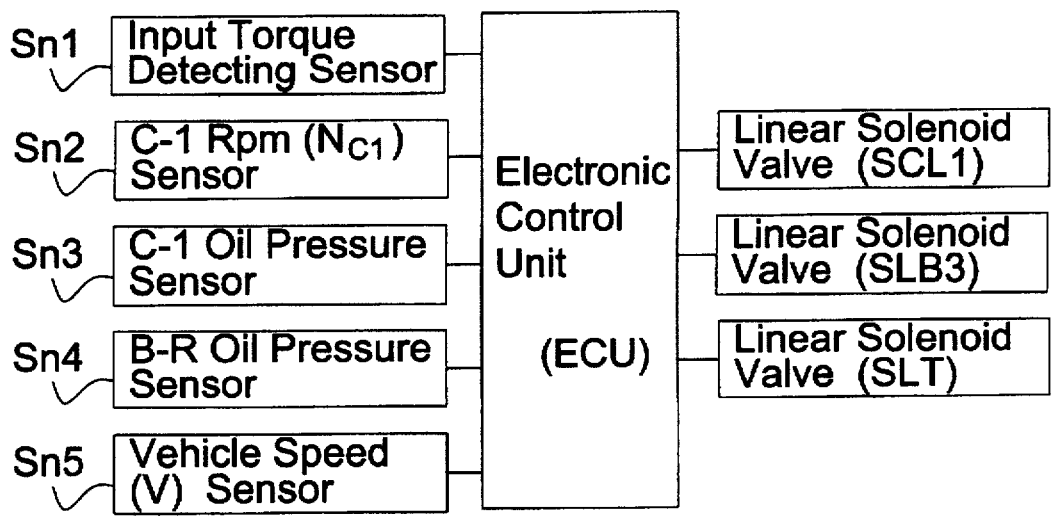
FIG. 4 is a block diagram showing an electronic control unit of the aforementioned automatic transmission and the relationship between the inputs and outputs of the electronic control unit.

FIG. 4 shows the electronic control unit (ECU), controls the automatic transmission through the aforementioned hydraulic control unit, and the relationship of the inputs/outputs to the electronic control unit. As shown, this electronic control unit is composed of input means including an input torque detecting sensor Sn1, a clutch C-1 RPM sensor Sn2, a clutch C-1 oil pressure sensor Sn3 arranged in the aforementioned oil pressure circuit, a B-R oil pressure sensor Sn4 and a vehicle speed sensor Sn5; and output means including the individual linear solenoid valves SLC1, SLB2 and SLT in the aforementioned hydraulic control unit. By applying the electric signals to the individual linear solenoids of the output means, the hydraulic control unit controls the individual hydraulic servos which then control the friction clutch C-1, the meshing brake B-R, and the band brake B-3.

Figure 6:
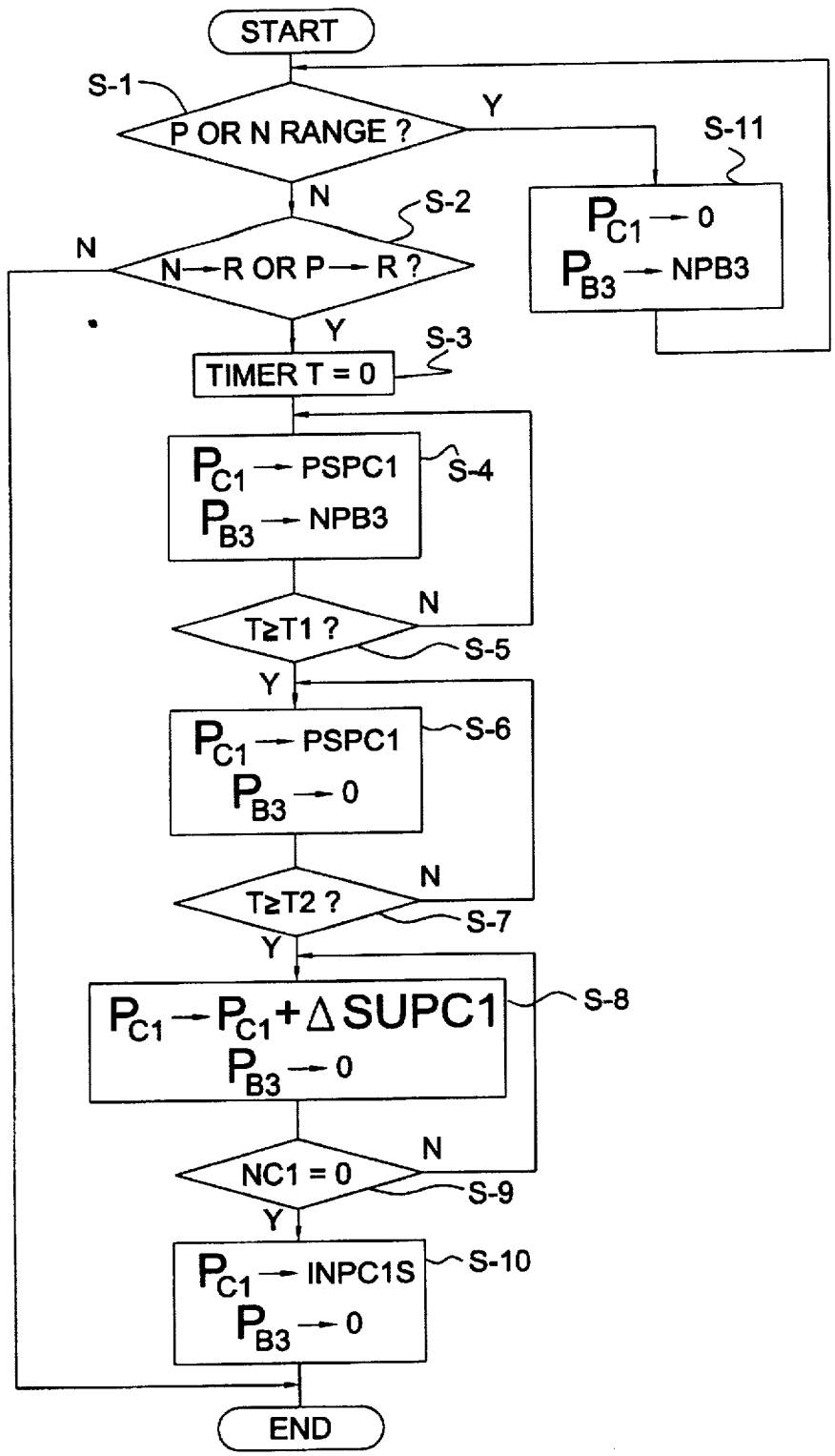
FIG. 6 is a flowchart showing the controls at the N→R (or P→R) shift time by the control system of the aforementioned first embodiment.

The system, thus structured, can have two embodiments by changing the decision means for the controls. First of all, FIG. 6 is a flowchart showing the shifts from the neutral (N) range to the reverse (R) range (as will be abbreviated as the "IN→R shift" like the remaining shifts) or the P (parking) →R shift. According to the first embodiment of the invention, where the application of the brake B-R is determined by a timer, whereas the application of the friction clutch C-1 is detected in terms of the number of revolutions.

In this embodiment, at Step S-1, it is determined whether the shift is in the P-range or the N-range based on the signal of a neutral start switch, as normally mounted in the automatic transmission. If this answer is YES (Y), at Step S-11 the supply pressure ($P_{C1}$) to the hydraulic servo 67 of the clutch C-1 is set to 0 and the supply pressure ($P_{B3}$) to the hydraulic servo 69 of the brake B-3 is set to a supply oil pressure (NPB3) in the N-or P-range, which is a level capable of stopping the transmission mechanism against the dragging torque of the clutch C-1.

If the answer to Step S-1 is NO (N), it is determined at Step S-2 whether the shift is the N→R shift or the P→R shift. If this decision is NO (N), the shift is made to the drive (D) range and control ceases. If the answer is YES (Y), the time T is reset to T=0 at Step S-3. At Step S-4, the supply pressure ($P_{C1}$) to the clutch C-1 is set to such an oil pressure (PSPC1) immediately before the clutch C-1 begins to be applied and balances with the return spring returning load when the piston stroke of the hydraulic servo 67 ends. The supply pressure ($P_{B3}$) to the brake B-3 is kept at the aforementioned oil pressure (NPB3).

At Step S-5, it is decided whether the timer value T≧T1. Here, the value T1 indicates the predetermined time at which the meshing engagement of the brake B-R starts where the piston 41 of the hydraulic servo 4 is positioned at the meshing engagement starting stroke position. If this answer is NO (N), and the meshing engagement of the brake B-R is not engaged, the routine returns to Step S-4. If the answer is YES (Y), the supply pressure ($P_{C1}$) to the clutch C-1 is set to the aforementioned oil pressure (PSPC1) at Step S-6, and the supply pressure ($P_{B3}$) to the brake B-3 is set to 0.

At Step S-7, it is determined whether the time value is T≧T2. Here, the value T2 indicates the predetermined time at which the stroke of the brake B-R and the stroke of the piston 41 are complete. If the answer at Step S-7 is YES (Y), the supply pressure ($P_{C1}$) to the clutch C-1, which is set to the aforementioned oil pressure (PSPC1), is added at Step S-8 to a predetermined value ΔASUPC1. Here, the predetermined value (ΔSUPC1) is a value for raising the oil pressure gradually, and is added at predetermined times to the supply pressure ($P_{C1}$) so that the oil pressure rises at a predetermined pressure gradient so that clutch C-1 is applied smoothly. In addition, the supply pressure ($P_{B3}$) to the brake B-3 is kept at 0.

While these operations are being continued, the completion of the clutch application is determined at Step S-9, specifically, whether the clutch RPM NC1, as detected by the clutch RPM sensor Sn2, equals zero. If this answer is YES (Y), the supply pressure ($P_{C1}$) to the clutch C-1 is set at Step S-10 to a value (INPC1S). The value is set according to the input torque so that the application of the clutch C-1 can be kept even if the input torque fluctuates, and control ceases.

Figure 7:
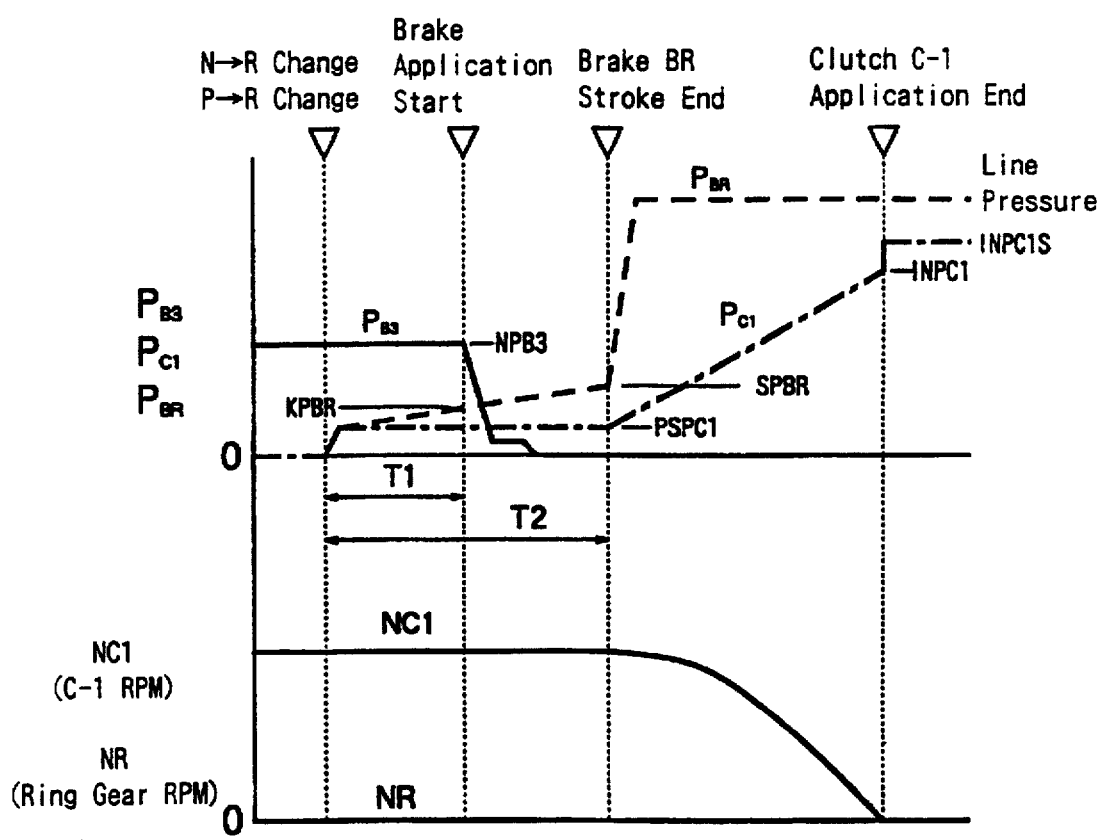
FIG. 7 is a time chart illustrating the changes in the oil pressure and the number of revolutions at the aforementioned N→R (or P→R) shift time.

A time chart of the changes in the number of revolutions and the oil pressure during this operation is presented in FIG. 7. As illustrated, the oil pressure ($P_{B3}$) of the brake B-3 is kept at the constant value (NPB3) by the operation of the aforementioned Step S-11. As a result, the number of revolutions (NR) of the ring gear R3 is at 0; the number of revolutions of the clutch C-1 is at the value (NC1) in the released state; and both the oil pressure ($P_{BR}$) of the brake B-R and the oil pressure ($P_{C1}$) of the clutch C-1 are at 0.

If the decision of the N→R or P→R shift at Step S-2 holds, the oil pressure ($P_{C1}$) is raised to the constant level (PSPC1) for the piston stroke simultaneously with the start of the timer T1. As the oil pressure ($P_{BR}$) is gradually raised, an oil pressure similar to the line pressure is fed to the R-range oil passage b through the switching action of the manual valve 63, by the piston stroke. When the time T=T1 is reached, the start of the brake meshing engagement is determined from the time elapsed, and the brake B-3 is released by the operation of the oil pressure $(P_{B3}) \to 0$. When the timer T=T2 is reached, the brake stroke completion is also determined from the time elapsed, and the brake pressure $(P_{BR})$ is raised to a line pressure which causes the clutch application while the clutch pressure $(P_{C1})$ is gradually raised, so that the clutch RPM (NC1) is gradually lowered to 0. Then, according to the operation of the final Step S-10, the clutch oil pressure is raised to the application maintaining oil pressure (INPC1S), and the control ceases.

Figure 8:
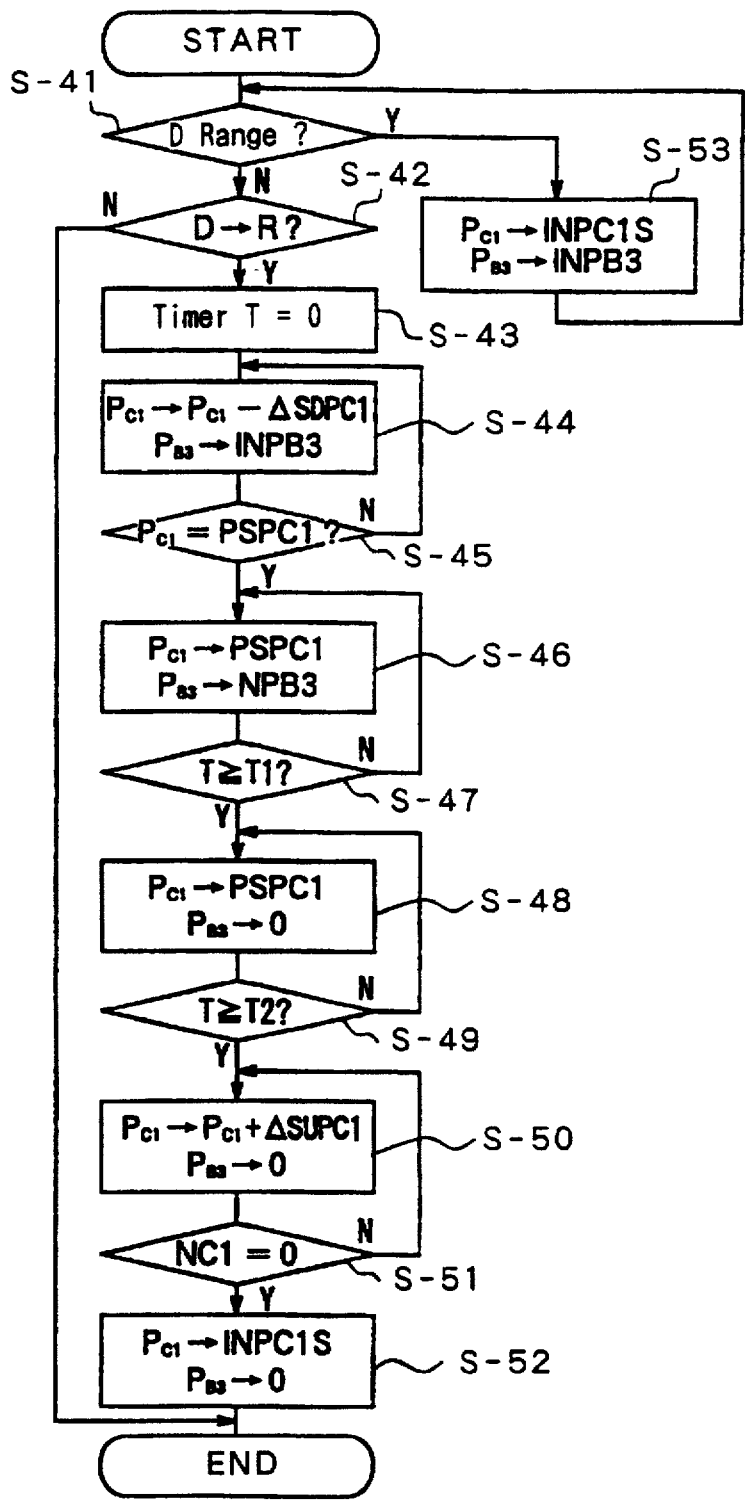
FIG. 8 is a flowchart showing the controls at a D→R shift time by the control system of the first embodiment.

Incidentally, the aforementioned flow has assumed the case in which the N- or P-range holding time is long. In the case of the D→R shift in which the N-range holding time is short, the initial control mode has to be changed slightly, and is embodied by the control flow shown in FIG. 8. Specifically, at Step S-41, it is determined whether the range is the D-range. If this answer is YES, the oil pressure supply at Step S-53 is repeated. Specifically, the supply pressure to the clutch C-1 is set to the value (INPC1S) for maintaining the clutch application, and the supply pressure to the brake B-3 is set to a value (INPB3) for maintaining its application. This value is the oil pressure of the hydraulic servo 69 in the D-range and is set to an oil pressure which will maintain the gear stage for the input torque.

Moreover, if it is decided at Step S-42 that the D→R shift holds, the timer is defaulted at Step S-43, and the clutch application pressure (PC1) is lowered at Step S-44 to a constant level. The subtracter $(\Delta SDPC1)$ in this operation subtracts a predetermined value at a predetermined time interval from the initial value $(P_{C1})$ so that the initial value $(P_{C1})$ is reduced at a predetermined reduction ratio which lowers the oil pressure gradually so as to release the clutch C-1 smoothly. In addition, the brake B-3 is also set to the value (INPB3) to maintain its application. This operation is continued until Step S-45 at which the oil pressure $(P_{C1})$ takes the value (PSPC1). The operations of subsequent Steps S-46 to S-52 are similar to those of Step S-4 to Step S-10 of the flow shown in FIG. 6, and their description will not be repeated.

Figure 9:
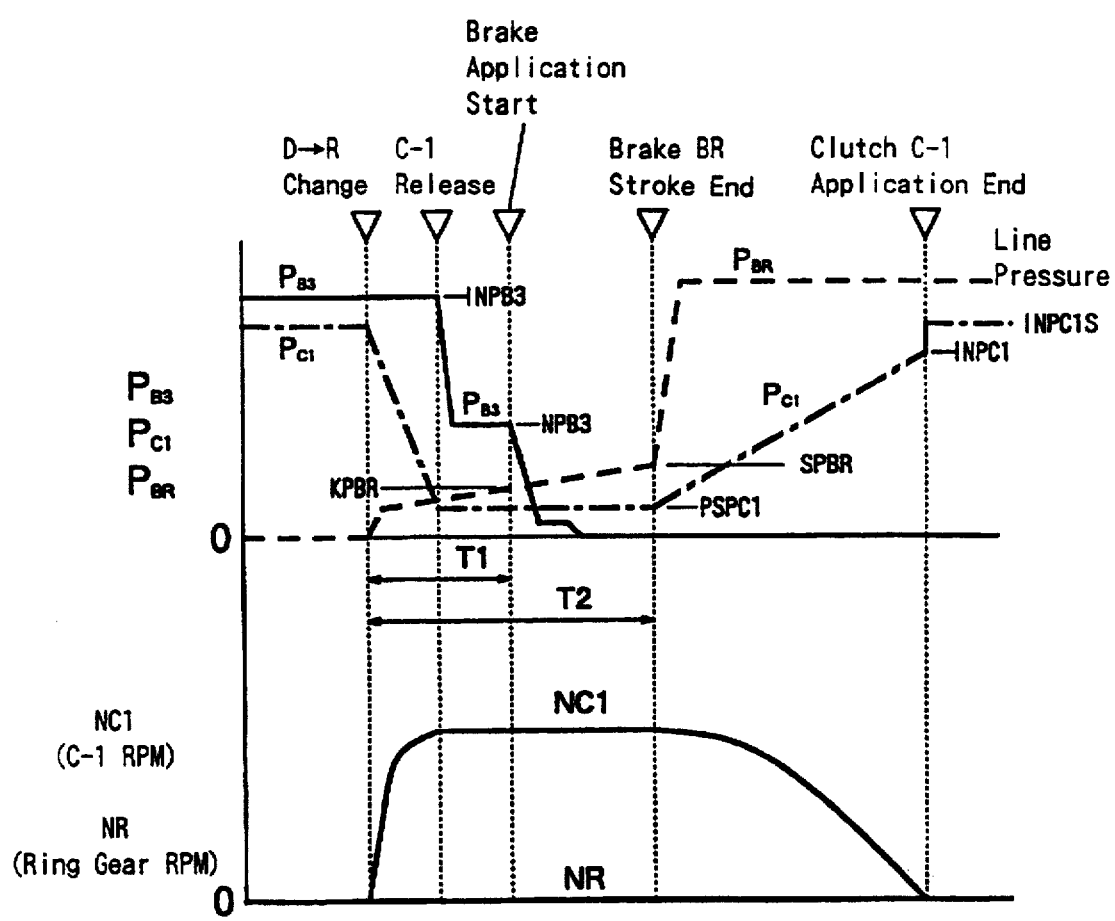
FIG. 9 is a time chart illustrating the changes in the oil pressure and the number of revolution at the aforementioned D→R shift time.

In FIG. 9, the oil pressure $(P_{C1})$ of the clutch C-1 is set at the application maintaining oil pressure (INPC1S) whereas the oil pressure $(P_{B3})$ of the brake B-3 is set at the application maintaining oil pressure (INPB3), as illustrated, by the aforementioned operation of Step S-53. From the application of the brake B-3, the RPM (NR) of the ring gear R3 is set to 0; the RPM NC1 of the clutch C-1 is set to 0 in the applied state; and the oil pressure $(P_{BR})$ of the brake B-R is set to 0.

If the D→R shift is determined at Step S-42 after the default of the time T=0, the oil pressure $(P_{C1})$ of the clutch C-1 is lowered to the value (PSPC1) in the standby state immediately before the return stroke of the piston. However, because the oil pressure $(P_{BR})$ of the brake B-R is gradually raised during the piston stroke an oil pressure similar to the line pressure is fed to the R-range oil passage b by switching the manual valve 63. If the release of the clutch C-1 is determined from the oil pressure (PSPC1) of the C-1 oil pressure sensor Sn3, then the oil pressure $(P_{B3})$ of the brake B-3 is lowered to the low oil pressure level (NPB3) for stopping the rotation of the ring gear R3, and continues until the timer T=T1. If the start of the brake meshing engagement is determined from the time elapsed, the brake B-3 is released at Step S-48 by the operation of the oil pressure $(P_{B3}) \to 0$. When the timer T=T2 is reached, the completion of the brake stroke is likewise determined from the time elapsed, the brake pressure $(P_{BR})$ is raised to a line pressure which will effect the clutch application operation. In addition, the clutch pressure $(P_{C1})$ is raised gradually, so that the clutch rotation (NC1) gradually reduced to 0. In accordance with the rise of the oil pressure at Step S-52, the oil pressure $(P_{C1})$ of the clutch C-1 is returned at last to the application maintaining oil pressure (INPC1S).

Thus, according to the control of this first embodiment, both the start of the meshing engagement and the stroke completion of the meshing brake B-R are executed by measuring the time periods with the timers T1 and T2 so that the applications can be controlled without using any special detection means.

Figure 10:
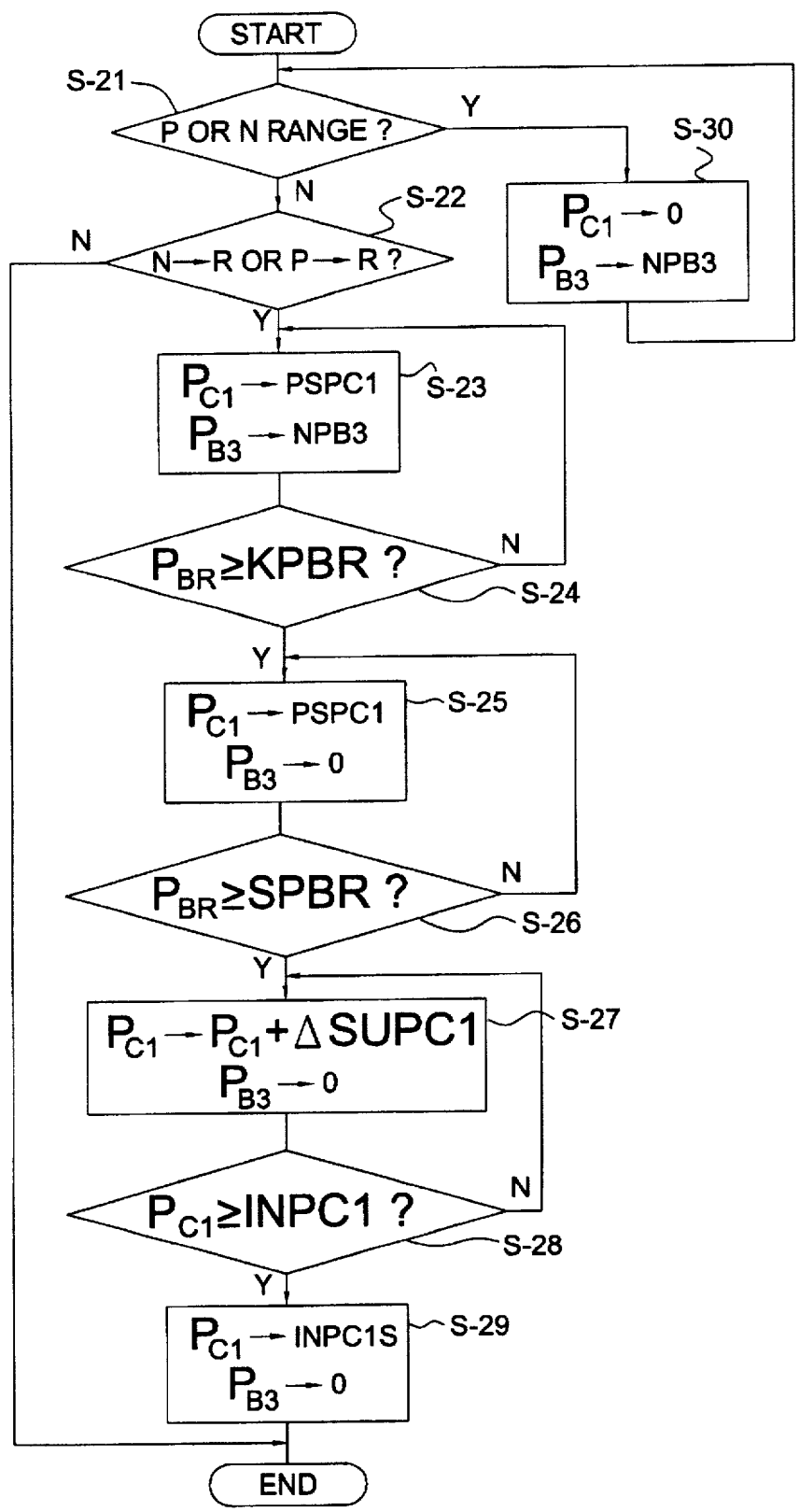
FIG. 10 is a flowchart showing the controls at the N→R (or P→R) shift time by the control system of a second embodiment.

Next, FIG. 10 is a flowchart showing the N→R (or P→R) change according to a second embodiment, in which the application of the brake B-R is determined by detecting the oil pressure with the B-R oil pressure sensor Sn4. In addition, the application of the friction clutch C-1 is detected by using the oil pressure detected by the C-1 oil pressure sensor Sn3.

In this embodiment, it is determined at first Step S-21 whether the range is in the P- or N-range. If this answer is YES (Y), the supply pressure $(PC_1)$ to the clutch C-1 is set to 0, and the supply pressure $(P_{B3})$ to the brake B-3 to the supply oil pressure (NPB3) are repeated at Step S-30.

If the answer is NO (N), it is determined at Step S-22 whether the shift is the N→R or the P→R shift. If this decision is YES (Y), the clutch oil pressure $(P_{C1})$ and the brake oil pressure $(P_{B3})$ are set at Step S-23, and the routine advances to Step S-24, where the start of engagement is determined. The start of the brake meshing engagement in this mode is determined upon whether the oil pressure $(P_{BR})$ of the hydraulic servo 4 to be detected by the brake B-R oil pressure sensor Sn4 is higher than an oil pressure value (KPBR). Here, the oil pressure value (KPBR) has a high level for starting the meshing engagement of the brake B-R which is set in terms of the spring constant of the return spring and the meshing start stroke. If the answer to Step S-24 is YES (Y), the routine advances to Step S-25.

Next, at Step S-25, the supply pressure $(P_{C1})$ to the clutch C-1 is set to the aforementioned oil pressure (PSPC1), and the supply pressure $(P_{B3})$ to the brake B-3 is set to 0.

In this state, it is determined at Step S-26 whether the stroke of the brake B-R is complete. This determination is made depending upon whether the oil pressure $P_{BR}$, as detected by the B-R oil pressure sensor Sn4, has reached such an oil pressure (SPBR) as to indicate the stroke completion of the brake B-R. The oil pressure (SPBR) is also set as in the aforementioned oil pressure value (KPBR) from a relationship between the spring constant of the return spring and the piston stroke. When the determination of the brake meshing completion thus holds, the supply pressure $(P_{C1})$ to the clutch C-1 is sequentially added by the value $(\Delta SUPC1)$ to the aforementioned oil pressure (PSPC1). In addition, the supply pressure $(P_{B3})$ to the brake B-3 is set to 0.

While continuing these operations, the clutch application completion is determined at Step S-28. Here, this determination may be made in terms of either the oil pressure value (INPC1), as detected in terms of the C-1 oil pressure sensor Sn3, or the control output value, as set according to the input torque. However, the determination may be made more practically in terms of the detected value. If the answer to S-28 is YES (Y), at final Step S-29, the control ceases by setting the supply pressure $(P_{C1})$ of the clutch C-1 to the application maintaining oil pressure (INPC1S) and the supply pressure $(P_{B3})$ of the band brake B-3 to 0.

The changes in the clutch C-1 RPM (NC1), the ring gear RPM (NR) and the individual hydraulic servo oil pressures ($P_{C1}$, $P_{B3}$ and $P_{BR}$) are similar to those of the time chart, as presented in FIG. 7 and referred to in the first embodiment, except that the elapsed timer times T1 and T2, and their description will be omitted.

Figure 11:
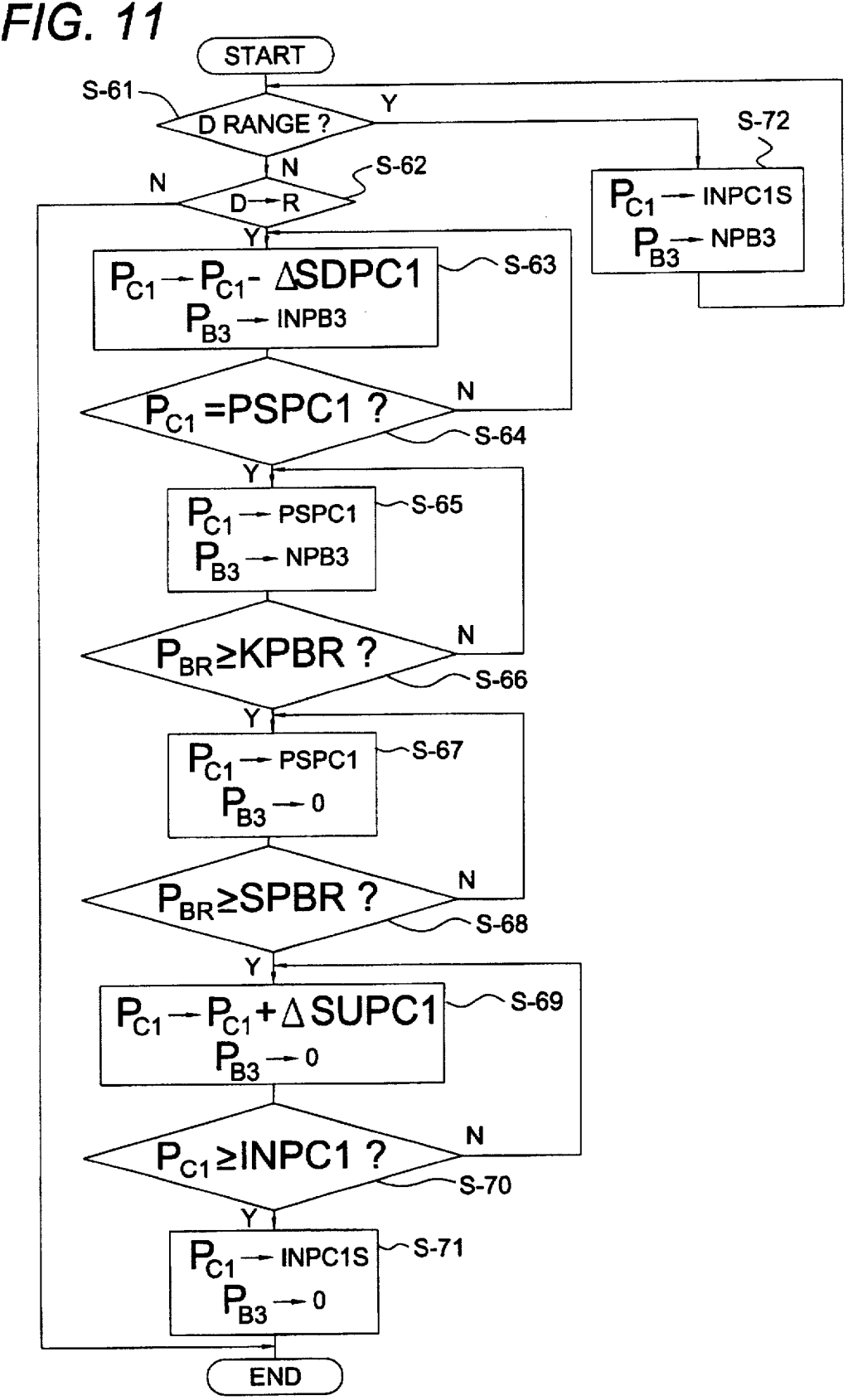
FIG. 11 is a flowchart showing the controls at the D→R shift time by the control system of the second embodiment.

In the D→R shift in the second embodiment, the first half of the control is modified to provide the control flow shown in FIG. 11. Specifically, it is determined at Step S-61 whether the range is the D-range. If this answer is YES (Y), the oil pressure supply of Step S-72 is repeated. If it is determined at Step S-62 that the D→R shift holds, the operations of Step S-63 to reduce the application pressure ($P_{C1}$) gradually and to set the application pressure ($P_{B3}$) of the brake B-3 to the value (INPB3) for maintaining application, are executed. Moreover, these operations are continued until it is decided at Step S-64 that the oil pressure ($P_{C1}$) takes the value (PSPC1). The later operations are similar to those of the flow shown in FIG. 10, and their description will be omitted by referring to the description of FIG. 10.

The changes in the clutch C-1 RPM (NC1), the ring gear RPM (NR) and the individual hydraulic servo oil pressures ($P_{C1}$, $P_{B3}$ and $P_{BR}$) are similar to those of the time chart, as presented in FIG. 9 and referred to in the first embodiment, except the elapsed timer times T1 and T2, and their description will be omitted.

Thus, according to the control of the second embodiment, both the decisions of the meshing start and the stroke completion of the meshing brake B-R are made in terms of the oil pressure detected by the B-R oil pressure sensor Sn4. Thus, both determinations are accurately made on the basis of the oil pressure values (KPBR and SPBR) which are predetermined from the relationship between the load of the return spring 42 and the stroke position of the piston 41.

Although the invention has been described as applied to an automatic transmission equipped with the specific transmission mechanism, it should not be limited to the transmission, as exemplified in the foregoing embodiments, but can be applied to a variety of transmission mechanisms. Thus, the invention can be practiced by modifying the specific structure in various ways within the scope of the individual claims.

What is claimed is:

1. In an automatic transmission comprising a transmission mechanism for establishing a plurality of forward gear stages, a neutral state and a reverse stage, wherein the transmission mechanism includes:

a predetermined rotary element to be retained for establishing the reverse stage;

a reverse brake for retaining the rotary element; and a frictional engagement element capable of stopping the rotation of the rotary element, wherein the reverse brake is a meshing type brake for retaining the rotary element by meshing with the rotary element; and a control system comprising engagement means for applying the frictional engagement element, when the reverse stage is selected, at least until a meshing engagement of the reverse brake is established, to stop the predetermined rotary element.

2. An automatic transmission according to claim 1, wherein the frictional engagement element is applied when the forward stages are established and retain a second rotary element other than the predetermined rotary element.

3. An automatic transmission according to claim 1, wherein the frictional engagement element is a band brake.

4. An automatic transmission according to claim 1, wherein the reverse brake includes a hydraulic servo and a meshing member adapted to be moved against the push force of a return spring, when a piston of the hydraulic servo moves, to come into meshing engagement with the predetermined rotary element.

5. An automatic transmission according to claim 1, said control system further comprising decision means for determining a meshing stage of a meshing member of the reverse brake, wherein the engagement means brings the frictional engagement element into engagement until a meshing start is detected by the decision means.

6. An automatic transmission according to claim 5, wherein the decision means determines the meshing start based on a lapse of a predetermined time from selection of the reverse stage, and a set time is a time period from start of a supply of an oil pressure to the hydraulic servo of the reverse brake to the start of the meshing engagement of the meshing member.

7. An automatic transmission according to claim 5, wherein the decision means includes an oil pressure sensor disposed in an oil passage connected to the hydraulic servo of the reverse brake, so that the decision means determines the meshing start when the signal from the oil pressure sensor takes an oil pressure value corresponding to a meshing start position of the meshing member.

8. An automatic transmission according to claim 2, wherein the frictional engagement element is also applied in the neutral state.

9. An automatic transmission according to claim 5, wherein the reverse stage is established by applying the predetermined rotary element with the reverse brake and by inputting power to a third rotary element by applying a friction clutch, and the friction clutch is left in a released state until the meshing start of the reverse brake is detected.

10. An automatic transmission according to claim 5, further comprising a second decision means for determining a completion of movement of the meshing member when a stroke of the piston of the hydraulic servo of the reverse brake is completed, wherein the reverse stage is established by inputting power to a third rotary element, as effected by retention of the predetermined rotary element of the reverse brake and by applying the friction clutch, and the friction clutch is applied after a completion of the stroke of the piston of the hydraulic servo of the reverse brake.

11. An automatic transmission according to claim 10, wherein the second decision means determines the completion of movement of the meshing member when a second predetermined time elapses from the selection of a reverse stage, and the predetermined time is set to a time period from a start of a supply of an oil pressure to the hydraulic servo of the reverse brake to a completion of movement of the meshing member.

12. An automatic transmission according to claim 10, wherein the second decision means includes an oil pressure sensor disposed in an oil passage connected to the hydraulic servo of the reverse brake for determining the completion of movement of the meshing member when the signal from the oil pressure sensor comes to a position corresponding to a final position of movement of the meshing member.

13. An automatic transmission according to claim 10, wherein the friction clutch is applied by the hydraulic servo of the friction clutch, and the hydraulic servo for the friction clutch is fed at first with an oil pressure immediately before a start of application of the friction clutch and then with the oil pressure raised gradually and simultaneously with the completion of movement of the meshing member.

14. An automatic transmission according to claim 9, wherein a lowermost one of the forward gear stages is established by applying the friction clutch and by applying the frictional engagement element.

15. An automatic transmission according to claim 10, wherein a lowermost one of the forward gear stages is established by applying the friction clutch and by applying the frictional engagement element.

* * * * *

UNITED STATES PATENT AND TRADEMARK OFFICE
CERTIFICATE OF CORRECTION

PATENT NO. : 5,792,022
DATED : August 11, 1998
INVENTOR(S) : Takayuki HISANO et al It is certified that error appears in the above-identified patent and that said Letters Patent is hereby corrected as shown below:

On the cover page, insert the following section:

--[30]   Foreign Application Priority Data

May 31, 1996   [JP]   Japan . . . . . . . . . . . 8-159285--.

Signed and Sealed this

Fourth Day of May, 1999

Attest:

Q. TODD DICKINSON

Attesting Officer     Acting Commissioner of Patents and Trademarks